UNITED STATES PATENT OFFICE 2,541,651

GENTISIC ACID COMPOUNDS OF ANTIPYRINES

Max Hoffer, Nutley, N. J., assignor to Hoffmann-La Roche Inc., Nutley, N. J., a corporation of New Jersey No Drawing. Application February 8, 1949, Serial No. 75,298

4 Claims. (Cl. 260—310)

The present invention relates to new compounds of gentisic acid and their method of preparation.

According to my invention, I have found that gentisic acid combines with antipyrine, 4-isopropyl-antipyrine, and 4-dimethylamino-antipyrine to form new gentisic acid compounds of these antipyrines, which can be represented by the following formula

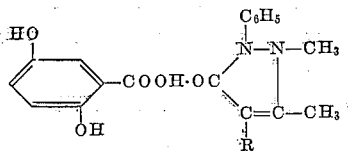

wherein R is a member of the group consisting of hydrogen, isopropyl, and dimethylamino. The new compounds are useful chemotherapeutically for their antipyretic and antirheumatic activity.

The new gentisic acid compounds can be prepared by reacting gentisic acid with 1-phenyl-2,3 - dimethyl - 5 - pyrazolone (antipyrine), 1-phenyl - 2,3 - dimethyl - 4 - dimethylamino - 5-pyrazolone (4-dimethylamino-antipyrine), and 1 - phenyl - 2,3 - dimethyl - 4 - isopropyl - 5-pyrazolone (4-isopropyl-antipyrine). The reaction takes place between equimolecular proportions of the reagents. However, an excess of one or the other component may be present. The reaction can be carried out in the presence or absence of any diluent or solvent for the components. As examples of suitable solvents, there can be employed water, alcohol, acetone, ethyl acetate, benzene, and the like. Any suitable temperature may be employed, but it is preferred to warm or heat the components to facilitate the reaction.

The new compounds are very stable. The compound from gentisic acid and 1-phenyl-2,3-dimethyl-4-isopropyl-5-pyrazolone is practically insoluble in both hot and cold water. It is very soluble in the usual organic solvents, except petroleum ether. Thus, it readily dissolves in alcohols, such as methyl alcohol, ethyl alcohol, propyl alcohol, butyl alcohol and amyl alcohol; ketones, such as acetone and methyl ethyl ketone; esters such as methyl acetate and ethyl acetate; and hydrocarbon solvents such as benzene, toluene, and the like. It can be readily crystallized from benzene. For this reason, benzene is preferably employed as the solvent medium in carrying out the reaction to form the compound.

The compounds from gentisic acid and 1-phenyl-2,3-dimethyl-5-pyrazolone, and from gentisic acid and 1-phenyl-2,3-dimethyl-4-dimethylamino-5-pyrazolone have, in general, a lower solubility in the usual organic solvents, as for example, those above named, than the compound from gentisic acid and 1-phenyl-2,3-dimethyl-4-isopropyl-5-pyrazolone. It is advantageous to employ ethyl acetate instead of benzene as the diluent in the preparation of these two compounds since the final products are obtained in a higher state of purity than when benzene is employed.

The solubility of the compound from gentisic acid and 1-phenyl-2,3-dimethyl-5-pyrazolone is very low in both hot and cold water. The compound from gentisic acid and 1-phenyl-2,3-dimethyl-4-dimethylamino-5-pyrazolone, on the other hand, is quite soluble in hot water though slightly soluble in cold water. It can therefore be easily recrystallized from water.

The following examples will serve to illustrate the invention:

EXAMPLE 1

*Gentisic acid·1-phenyl-2,3-dimethyl-4-isopropyl-5-pyrazolone*

15.6 grams of gentisic acid, 23 grams of 1-phenyl - 2,3 - dimethyl-4-isopropyl-5 - pyrazolone and 100 cc. of benzene were mixed and the mixture was heated to 70–80° C. until all the reagents except a small amount of gentisic acid had gone into solution. The solution was filtered under suction. The filtrate was cooled to room temperature (20–25° C.) and allowed to stand until crystallization occurred. The crystalline mass was filtered under suction and washed on the filter with 20 cc. of benzene at 20–25° C. The mass was then dissolved in 100 cc. of hot benzene at 20–25° C. and the solution allowed to cool slowly. The gentisic acid·1-phenyl-2,3-dimethyl-4-isopropyl-5-pyrazolone deposited in white silky plates, M. P. 106° C.

EXAMPLE 2

*Gentisic acid·1-phenyl-2,3-dimethyl-4-isopropyl-5-pyrazolone*

15.6 grams of gentisic acid, 23 grams of 1-phenyl - 2,3 - dimethyl-4-isopropyl-5-pyrazolone and 100 cc. of benzene were mixed and the mixture was heated to 70–80° C. until all the reagents except a small amount of gentisic acid had gone into solution. The solution was filtered under suction. The filtrate was cooled to room temperature (20–25° C.), seeded with some of the gentisic acid·1-phenyl-2,3-dimethyl-4-isopropyl-5-pyrazolone which had been previously prepared according to Example 1, and stirred. The reaction solution rapidly turned to a thick crystalline mass with evolution of heat of crystallization. After cooling, the crystalline mass was filtered under suction and washed on the filter with 20 cc. of benzene at 20–25° C. The mass was dissolved in 100 cc. of hot benzene and the solution allowed to cool slowly. The gentisic acid·1-phenyl-2,3-dimethyl-4-isopropyl-5-pyrazolone deposited in white shiny, silky plates, M. P. 106° C.

EXAMPLE 3

Gentisic acid·1-phenyl-2,3-dimethyl - 5 - pyrazolone 15.6 grams of gentisic acid and 18.8 grams of 1-phenyl-2,3-dimethyl-5-pyrazolone were heated in 75 cc. of ethyl acetate on a steam bath until all the material had dissolved. The solution was allowed to cool at 0–5° C. during which time crystallization occurred. The crystals were filtered under suction and dried at 50–60° C. The compound thus obtained was gentisic acid·1-phenyl-2,3-dimethyl-5-pyrazolone and had a M. P. 87–88° C. The melting point did not change after repeated recrystallization from ethyl acetate.

EXAMPLE 4

Gentisic acid·1-phenyl-2,3-dimethyl-4-dimethylamino-5-pyrazolone 15.6 grams of gentisic acid were dissolved in 75 cc. of hot ethyl acetate and the solution was combined with a warm solution of 23.1 grams of 1-phenyl-2,3-dimethyl-4-dimethylamino-5-pyrazolone in 50 cc. of ethyl acetate. The mixture was kept at 0–5° C. until crystallization occurred. The crystals were filtered under suction and dried at 80–90° C. The compound thus formed was gentisic acid·1-phenyl-2,3-dimethyl-4-dimethylamino-5-pyrazolone, M. P. 121–122° C. The material was recrystallized from 120 cc. of water and then had a M. P. of 122.5° C. which did not change after repeated recrystallization from either water or ethyl acetate.

I claim:

1. A compound of the class consisting of gentisic acid·1- phenyl -2,3- dimethyl -5- pyrazolone, gentisic acid·1-phenyl-2,3-dimethyl-4-isopropyl-5-pyrazolone, and gentisic acid·1-phenyl-2,3-dimethyl -4- dimethylamino -5- pyrazolone, which can be represented by the following formula

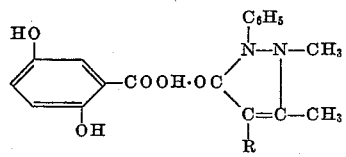

wherein R is a member of the group consisting of hydrogen, isopropyl, and dimethylamino.

2. Gentisic acid·1 - phenyl - 2,3 - dimethyl - 4-isopropyl-5-pyrazolone.

3. Gentisic acid·1 - phenyl - 2,3 - dimethyl - 5-pyrazolone.

4. Gentisic acid·1 - phenyl - 2,3 - dimethyl - 4-dimethylamino-5-pyrazolone.

MAX HOFFER.

REFERENCES CITED

The following references are of record in the file of this patent:

FOREIGN PATENTS

| Number | Country | Date |
|--------|---------|------|
| 419,902 | France | Nov. 8, 1910 |

OTHER REFERENCES

Frankel: "Die Arzneimittel Synthese" (Berlin, 1927), pp. 240, 241.